United States Patent
Riad et al.

(10) Patent No.: US 11,618,348 B2
(45) Date of Patent: Apr. 4, 2023

(54) SYSTEMS AND METHODS OF ADJUSTING THE HARDNESS OF A PASSENGER SEAT

(71) Applicant: Honda Motor Co., Ltd., Tokyo (JP)

(72) Inventors: Yousuf S. Riad, Dublin, OH (US); Brian D. Shanfeld, Powell, OH (US); Kelly Michael Whalen, Northington, OH (US); Eric D. Daume, Plain City, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 7 days.

(21) Appl. No.: 16/883,173

(22) Filed: May 26, 2020

(65) Prior Publication Data

US 2021/0370802 A1 Dec. 2, 2021

(51) Int. Cl.
*B60N 2/02* (2006.01)
*B60N 2/90* (2018.01)
*A47C 4/54* (2006.01)
*B60N 2/66* (2006.01)

(52) U.S. Cl.
CPC ............ *B60N 2/0244* (2013.01); *B60N 2/914* (2018.02); *A47C 4/54* (2013.01); *B60N 2/665* (2015.04); *B60N 2002/026* (2013.01)

(58) Field of Classification Search
CPC ...... B60N 2/914; B60N 2/665; B60N 2/0244; A47C 4/54
See application file for complete search history.

(56) References Cited

U.S. PATENT DOCUMENTS

| | | | |
|---|---|---|---|
| 4,589,695 A * | 5/1986 | Isono | A47C 7/467 |
| | | | 297/284.9 |
| 6,427,538 B1 | 8/2002 | Potter | |
| 6,789,284 B2 | 9/2004 | Kemp | |
| 6,873,892 B2 | 3/2005 | Katz et al. | |
| 6,894,234 B1 | 5/2005 | Sottong | |
| 7,156,467 B2 * | 1/2007 | Kimmig | A47C 7/467 |
| | | | 297/452.41 |
| 7,407,029 B2 | 8/2008 | Breed et al. | |
| 7,424,355 B2 | 9/2008 | Molitor et al. | |
| 8,616,654 B2 | 12/2013 | Zenk et al. | |
| 8,958,955 B2 | 2/2015 | Hotary et al. | |
| 9,428,082 B2 | 8/2016 | Hotary et al. | |
| 9,630,533 B2 | 4/2017 | Misch et al. | |
| 9,688,163 B2 | 6/2017 | Hotary et al. | |
| 9,845,026 B2 | 12/2017 | Pereny et al. | |
| 9,884,570 B2 | 2/2018 | Hanlon et al. | |
| 9,889,770 B2 | 2/2018 | Hotary et al. | |
| 9,987,961 B2 | 6/2018 | Zouzal et al. | |
| 10,293,718 B1 * | 5/2019 | Llievski | B60N 2/501 |
| 10,640,010 B2 * | 5/2020 | Yetukuri | B60N 2/914 |
| 2006/0091716 A1 * | 5/2006 | Fortune | A47C 31/126 |
| | | | 297/452.41 |

(Continued)

*Primary Examiner* — Syed A Islam
(74) *Attorney, Agent, or Firm* — Armstrong Teasdale LLP

(57) ABSTRACT

An adjustable seat system for use with a vehicle, with the system including a cushion associated with a passenger seat of the vehicle. The cushion includes a support structure and a bladder encapsulating the support structure, wherein the support structure is formed from a porous foam material. The system also includes an actuator in communication with the bladder, wherein the actuator is configured to selectively adjust the hardness of the cushion by inflating and deflating the bladder.

20 Claims, 5 Drawing Sheets

(56) References Cited

U.S. PATENT DOCUMENTS

| | | |
|---|---|---|
| 2008/0122272 A1 | 5/2008 | Aoki et al. |
| 2015/0008710 A1* | 1/2015 | Young ................... B60N 2/914 297/217.3 |
| 2017/0274801 A1 | 9/2017 | Shibata et al. |
| 2018/0022246 A1 | 1/2018 | Patrick et al. |
| 2018/0029503 A1 | 2/2018 | Dhaini et al. |
| 2018/0093589 A1 | 4/2018 | Sugiyama et al. |
| 2018/0118054 A1 | 5/2018 | Devilbiss et al. |
| 2018/0186251 A1 | 7/2018 | Yetukuri et al. |
| 2018/0264974 A1* | 9/2018 | Ramachandran .... B60N 2/0232 |
| 2019/0351787 A1* | 11/2019 | Lodhia ................. A47C 31/126 |

* cited by examiner

SYSTEMS AND METHODS OF ADJUSTING THE HARDNESS OF A PASSENGER SEAT

BACKGROUND

The present disclosure relates generally to vehicle passenger seats including adjustable comfort settings and, more specifically, to systems and methods of adjusting the hardness of a seat based on road conditions as sensed by a vehicle's suspension system.

Traditional vehicle seats are formed with a generally horizontal seat base and a seatback that is coupled to the seat base to enable an occupant of the automobile to be supported in a seated posture. At least some known vehicle seats include various mechanisms that enable the occupant to adjust physical characteristics of the seat base and/or seatback to provide a desired level of comfort to the occupant. For example, at least some known seats enable the orientation of the seatback to be selectively adjusted relative to the seat base, as well as for adjusting a level of support provided by the seatback against the lower back of the occupant. At least some known vehicle seats can also enable a stiffness of the seat base and/or the seat back to be selectively adjusted. For example, adjustments to the seat stiffness may be made manually by the occupant before or during operation of the vehicle, or the level of seat stiffness may be set to a predetermined level based on a driving mode in which the vehicle is currently operating. Despite their use however, known seat adjustment mechanisms merely provide static adjustability to the vehicle seats.

BRIEF DESCRIPTION

In one aspect, an adjustable seat system for use with a vehicle is provided. The system includes a cushion associated with a passenger seat of the vehicle. The cushion includes a support structure and a bladder encapsulating the support structure, wherein the support structure is formed from a porous foam material. The system also includes an actuator in communication with the bladder, wherein the actuator is configured to selectively adjust the hardness of the cushion by inflating and deflating the bladder.

In another aspect, a vehicle is provided. The vehicle includes a seat including a passenger seat that includes a seat bottom, a seat back, and a cushion associated with at least one of the seat bottom and the seat back. The cushion includes a support structure and a bladder encapsulating the support structure, wherein the support structure is formed from a porous foam material. The vehicle also includes an actuator in communication with the bladder, wherein the actuator is configured to selectively adjust the hardness of the cushion by inflating and deflating the bladder.

In yet another aspect, a method of adjusting seat hardness of a seat in a vehicle is provided. The passenger seat includes a seat bottom, a seat back, and a cushion associated with at least one of the seat bottom and the seat back. The cushion includes a support structure and a bladder encapsulating the support structure, wherein the support structure is formed from a porous foam material, the method comprising. The method includes monitoring at least one operating parameter of the vehicle, and selectively adjusting the hardness of the cushion by inflating and deflating the bladder based on the at least one operating parameter.

DETAILED DESCRIPTION

The embodiments described herein relate generally to systems and methods for use in adjusting the hardness of a seat based on road conditions as sensed by a vehicle's suspension system. In the exemplary embodiment, the adjustable seat hardness system includes a bladder system that is positionable within a passenger seat of a vehicle, and an actuator that communicates with the bladder system to enable selective adjustment of the hardness of the passenger seat by inflating and deflating the bladder system. For example, the passenger seat includes a seat bottom, a seat back, and a cushion associated with at least one of the seat bottom and the seat back. The cushion includes a support structure, formed from a porous foam material, encapsulated by the bladder system. The support structure provides rigidity and support to the cushion, and also enables the hardness of the cushion to be adjusted by the bladder system.

In some embodiments, the hardness of the cushion is selectively and automatically adjustable based on at least one operating parameter of the vehicle. For example, the hardness of the cushion may be adjusted when the seat hardness system is set to operate in one or more preset modes, or may be adjusted based on feedback received from other systems of the vehicle. The preset modes facilitate automatically adjusting the hardness of the cushion based on a programmed sequence. Alternatively, or in addition to the preset modes, the seat hardness may be adjusted in response to conditions experienced by the vehicle during operation, such as a pressure sensed on the passenger seat or directional forces experienced by the vehicle.

In one embodiment, the actuator is in communication with a suspension monitoring device that monitors operation of a suspension system of the vehicle. Accordingly, the actuator selectively adjusts the hardness of the passenger seat based on road conditions sensed by the vehicle's suspension system, and as monitored by a suspension monitoring device. For example, in one embodiment, the actuator can deflate the bladder system of the passenger seat as the vehicle encounters poor road conditions such as potholes, construction zones, speed bumps, and the like. Deflating the bladder system facilitates absorption of vibrational load changes, thereby enhancing the comfort of the occupant. Alternatively, the actuator can inflate predetermined regions of the bladder system as the vehicle experiences increased G-forces during cornering, for example, to facilitate increased support to the occupant. As such, the occupant(s) of the vehicle are provided with an enhanced and dynamically-adjustable driving experience.

Figure 1:
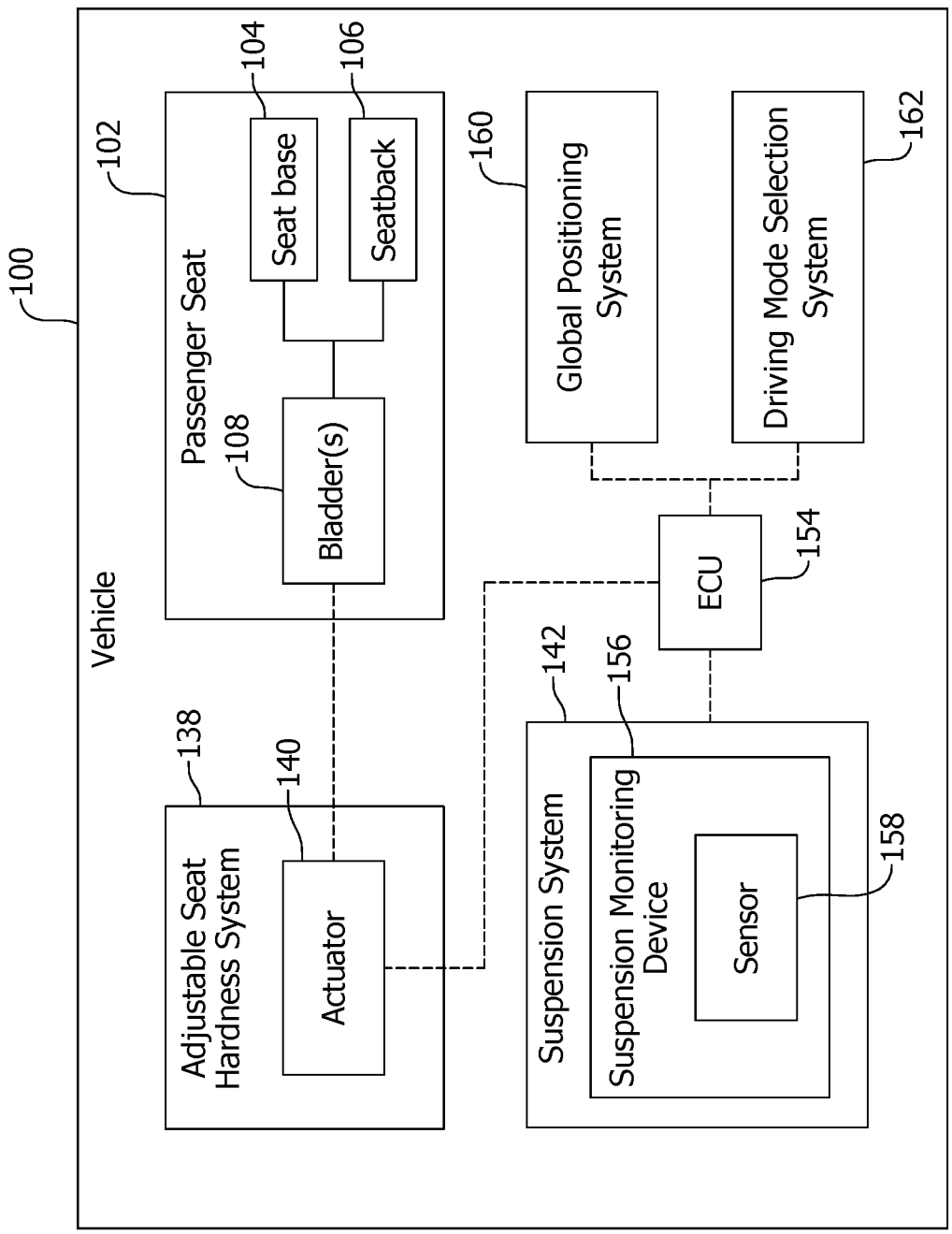
FIG. 1 is a block diagram illustrating an exemplary vehicle.

FIG. 1 is block diagram illustrating an exemplary vehicle 100. In the exemplary embodiment, vehicle 100 includes at least one passenger seat 102 and an adjustable seat hardness system 138 in communication with passenger seat 102. Passenger seat 102 includes a seat base 104, a seatback 106, and at least one bladder 108 positionable within seat base 104 and/or seatback 106 of passenger seat 102. Bladder 108 is selectively inflatable and deflatable to facilitate adjustment of the seat hardness of passenger seat 102.

Figure 2:
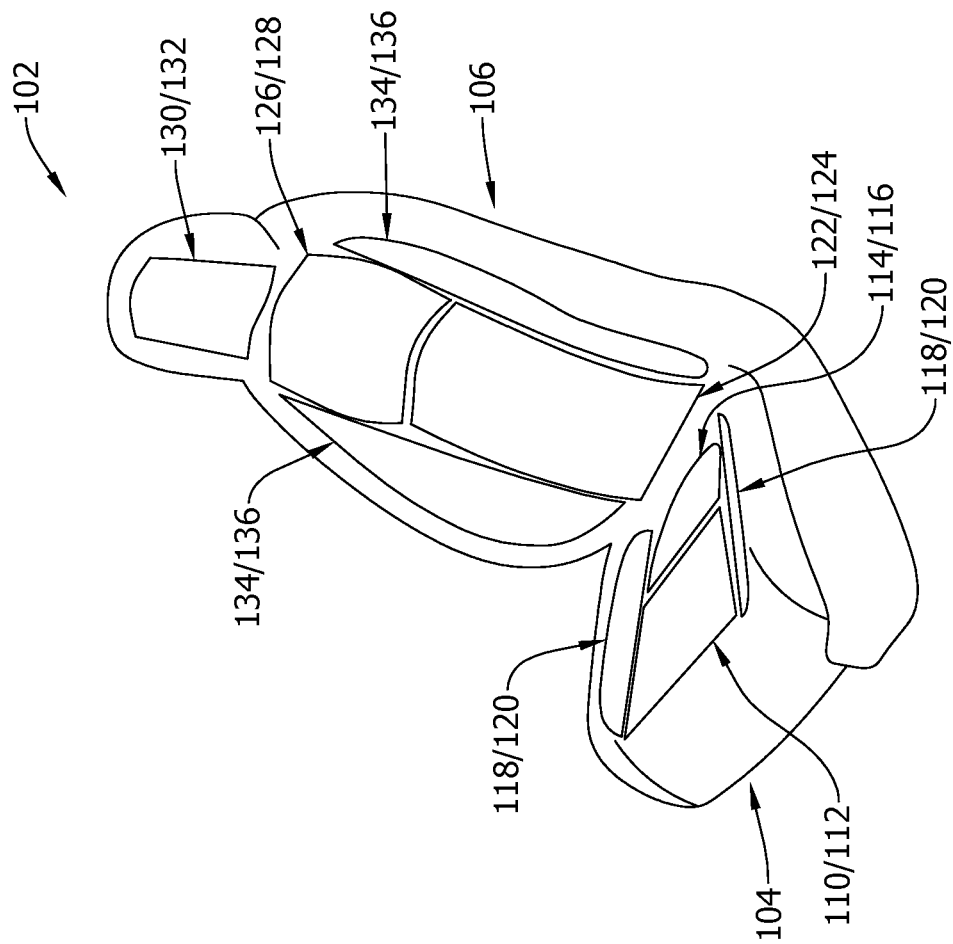
FIG. 2 is a perspective view of an exemplary passenger seat that may be used with the vehicle shown in FIG. 1.

For example, and referring to FIG. 2, passenger seat 102 includes a plurality of bladders 108 positioned in different regions of passenger seat 102. In the exemplary embodiment, bladders 108 include a first bladder 110 positioned in a front region 112 of seat base 104, a second bladder 114 positioned in a rear region 116 of seat base 104, third bladders 118 positioned in side bolster regions 120 of seat base 104, a fourth bladder 122 in a lower back region 124 of seatback 106, a fifth bladder 126 in an upper back region 128 of seatback 106, a sixth bladder 130 in a headrest 132 of seatback 106, and seventh bladders 134 in side bolster regions 136 of seatback 106. The plurality of bladders 108 are inflatable and deflatable to selectively adjust the hardness of passenger seat 102. The plurality of bladders 108 may be inflated and deflated individually, or each bladder 108 may be inflated and deflated synchronously with each other, as will be explained in more detail below. Alternatively, seat 102 may include any other number of bladders 108 positioned in any other orientations or locations that enables seat 102 and system 138 to function as described herein. Bladders 108 may be of any shape and size that enables system 138 to function as described herein.

Referring again to FIG. 1, adjustable seat hardness system 138 includes an actuator 140 in communication with bladders 108 for selectively inflating and deflating bladders 108. Actuator 140 may be any device that enables adjustable seat hardness system 138 to function as described herein. Example actuators include, but are not limited to, pneumatic or hydraulic pump systems. In addition, when vehicle 100 includes a plurality of passenger seats 102, the hardness of the plurality of passenger seats 102 may be selectively adjusted by a common actuator 140 positioned at a centralized location within vehicle 100, or each passenger seat 102 may be associated with its own distinct actuator 140.

Figure 3:
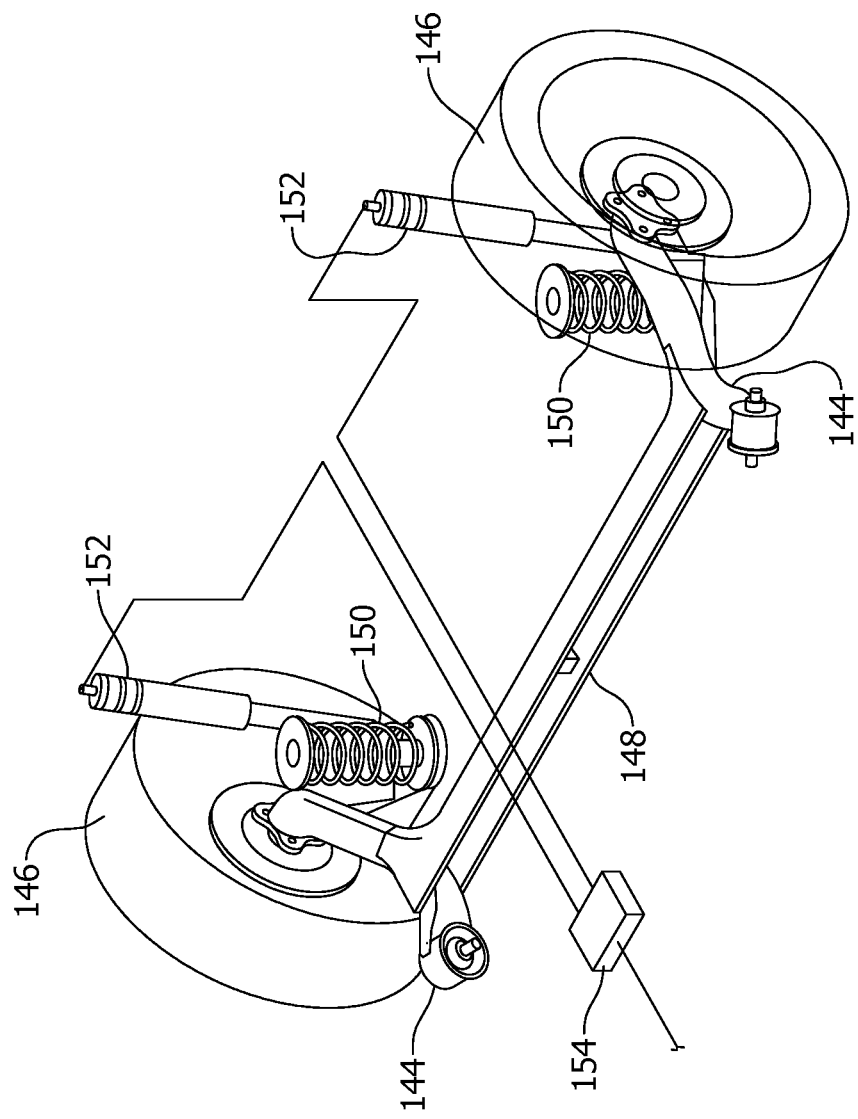
FIG. 3 is a perspective view of an exemplary suspension system that may be used with the vehicle shown in FIG. 1.

Vehicle 100 also includes a suspension system 142 that is responsive to road conditions in which vehicle 100 travels. Referring to FIG. 3, suspension system 142 is illustrated as being an H-shaped torsion beam suspension system, although it should be understood vehicle 100 may include any other suitable suspension system. In the exemplary embodiment, suspension system 142 includes a pair of trailing arms 144 each coupled to a wheel 146 of vehicle 100, and a torsion beam 148 extending between trailing arms 144. A coil spring 150 and a damper 152 are coupled to each trailing arm 144 to support vehicle 100 on the road and to facilitate reducing the transfer of vibrational forces absorbed by wheels 146 to a vehicle body (not shown). In the exemplary embodiment, each damper 152 is a variable damping force damper that uses Magneto-Rheological Fluid (MRF) to facilitate reducing the transfer of vibrational forces to the vehicle body. The use of MRF dampers enables the damping force provided by damper 152 to be varied under the control of an electronic control unit (ECU) 154, for example. Alternatively, any other suitable damper or shock-absorbing device may be used to facilitate damping forces induced to the vehicle body.

Referring again to FIG. 1, suspension system 142 includes a suspension monitoring device 156 that monitors operation of suspension system 142. In the exemplary embodiment, suspension monitoring device 156 includes a sensor 158 that monitors a load change induced to suspension system 142 as vehicle 100 travels on a roadway. For example, in one embodiment, sensor 158 may be integrated with ECU 154. Accordingly, sensor 158 may receive separate inputs from each damper 152 (shown in FIG. 3) of suspension system 142, with the inputs including data on the amount of damping force provided by each respective damper 152. The damping force data may also be referred to as load change data, which provides a real-time indication of the road conditions upon which vehicle 100 is traveling. For example, damper 152 may have a response time in the sub-second or centisecond range to facilitate providing substantially real-time feedback on the road conditions in which vehicle 100 is traveling.

Alternatively, sensor 158 may be an accelerometer, or any other suitable vibration sensor. At least one sensor 158 may be associated with each wheel 146 of vehicle 100. For example, at least one sensor 158 may be coupled to a portion of suspension system 142 for monitoring vibrational forces absorbed by each wheel 146 of vehicle 100 and/or forces induced to each wheel 146, thereby generating vibrational load change data. The vibrational load change data likewise provides a real-time indication of the road conditions upon which vehicle 100 is traveling. As will be described in more detail below, operation of actuator 140 is controlled based on road condition data (i.e., load change data) as determined by suspension monitoring device 156.

Vehicle 100 also includes a global positioning system 160 and a driving mode selection system 162. In operation, global positioning system 160 tracks the location and movement of vehicle 100 to facilitate generating vehicle position data. Driving mode selection system 162 enables an occupant of vehicle 100 to choose the feel of dynamic responses within vehicle 100 by changing various settings of vehicle 100, such as those of suspension system 142, based on an operating mode in which vehicle 100 is operating. For example, driving mode selection system 162 enables vehicle 100 to be selectively toggled between driving modes such as a normal driving mode, an economy driving mode, a comfort driving mode, and a sport driving mode. Suspension system 142, global positioning system 160, and driving mode selection system 162 communicate with ECU 154. ECU 154 controls the operation of actuator 140 based on inputs received from systems 142, 160, and 162.

During operation, ECU 154 receives load change data from suspension monitoring device 156, and directs actuator 140 to selectively inflate or deflate bladders 108 based on the load change data. For example, a quantitative value of load changes (i.e., vibrational responses), or a frequency of load changes over a given time period, sensed by suspension system 142 may define the load change data. Actuator 140 deflates bladders 108 when the value of the load change is greater than a predetermined threshold, or when the frequency of the load change is greater than a predetermined value. Accordingly, there is a reduction in the transfer of vibrational responses to the occupant of passenger seat 102, thereby providing them with a feeling of enhanced comfort. The degree of deflation of bladders 108 may also be controlled by ECU 154. In one embodiment, the degree of deflation is controlled based on a relative difference between the value of the load changes and the predetermined threshold, or based on a relative difference between the frequency of the load changes and the predetermined value. The greater the relative difference, the greater the degree of deflation. The greater the degree of deflation, the greater the reduction in the transfer of vibrational responses to the occupant of passenger seat 102.

In some embodiments, ECU 154 also controls the operation of actuator 140 based on vehicle position data received from global positioning system 160. As described above, global positioning system 160 tracks the location and movement of vehicle 100 to facilitate generating the vehicle position data. ECU 154 may correlate the vehicle position data with the road condition data, as determined by suspension monitoring device 156, to generate positional road condition data. The positional road condition data provides a historical correlation of load changes sensed by suspension system 142 at geographic locations in which vehicle 100 has previously traveled. The positional road condition data may be stored in ECU 154, and used to anticipate changes in road conditions to facilitate adjusting the hardness of passenger seat 102.

Suspension monitoring device 156 continuously monitors the operation of suspension system 142, and ECU 154 directs actuator 140 to re-inflate bladders 108 to a default level when the value of the load changes return to below the predetermined threshold, or when the frequency of the load changes return to below the predetermined value. The default level may be a preset or predetermined value, or may be set based on an input received from a user, such as the occupant of passenger seat 102. The input may be received at a user interface (not shown) within vehicle 100, wherein the user interface is in communication with ECU 154.

Operation of actuator 140 may also be based on the driving mode in which vehicle 100 is currently operating. For example, the selective inflation and deflation of bladders 108 may only be enabled when vehicle 100 is operating in certain operating modes, such as the comfort driving mode and the sport driving mode. In one embodiment, at least two bladders 108, and in some embodiments every bladder 108, are synchronously inflatable and deflatable with each other when vehicle 100 is set to operate in the comfort driving mode. Enabling synchronous inflation and deflation of bladders 108 facilitates providing overall enhanced absorption of vibrational load changes across the passenger seat 102.

Alternatively, only select bladders 108, such as third bladders 118 in side bolster regions 120 and seventh bladders 134 in side bolster regions 136 (all shown in FIG. 2), are selectively inflatable and deflatable when vehicle 100 is set to operate in the sport driving mode. For example, as vehicle 100 travels on a roadway and enters a corner, suspension monitoring device 156 may provide an input to ECU 154 indicating a positive load change has been detected on suspension system 142 on either the driver-side or passenger-side of vehicle 100. If vehicle 100 is turning to the right and the load change is detected on the driver-side of vehicle 100, driver-side bladders 118 and 134 in side bolster regions 120 and 136 may be inflated by ECU 154 and actuator 140. In contrast, if vehicle 100 is turning to the left and the load change is detected on the passenger-side of vehicle 100, passenger-side bladders 118 and 134 in side bolster regions 120 and 136 may be inflated by ECU 154 and actuator 140. Thus, bladders 118 and 134 are selectively inflatable to provide directional support to the occupant of passenger seat 102.

Figure 4:
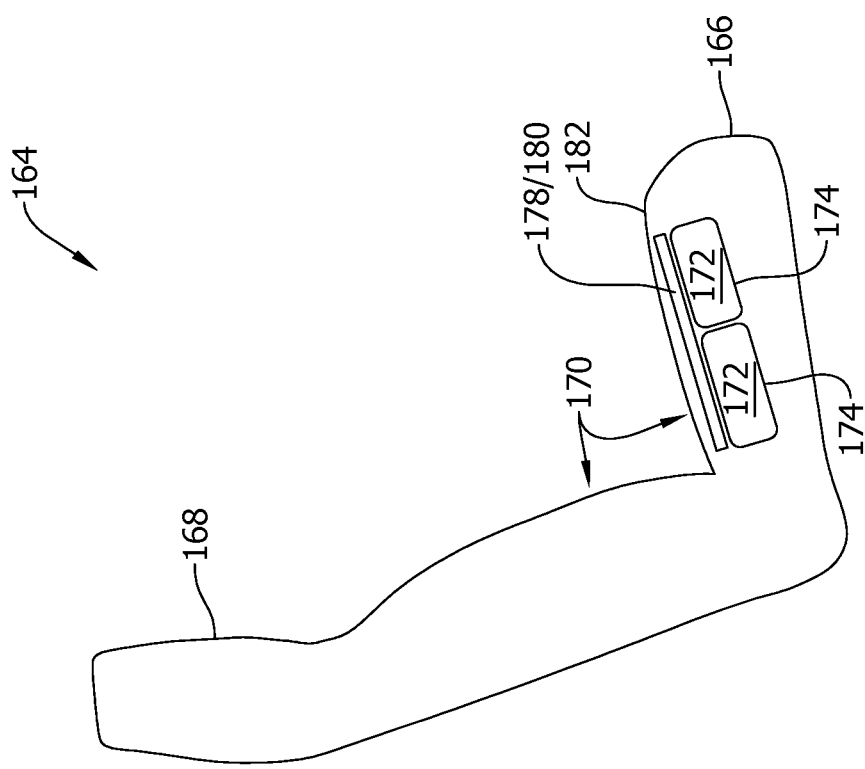
FIG. 4 is an internal side view of an alternative passenger seat that may be used with the vehicle shown in FIG. 1.
Figure 5:
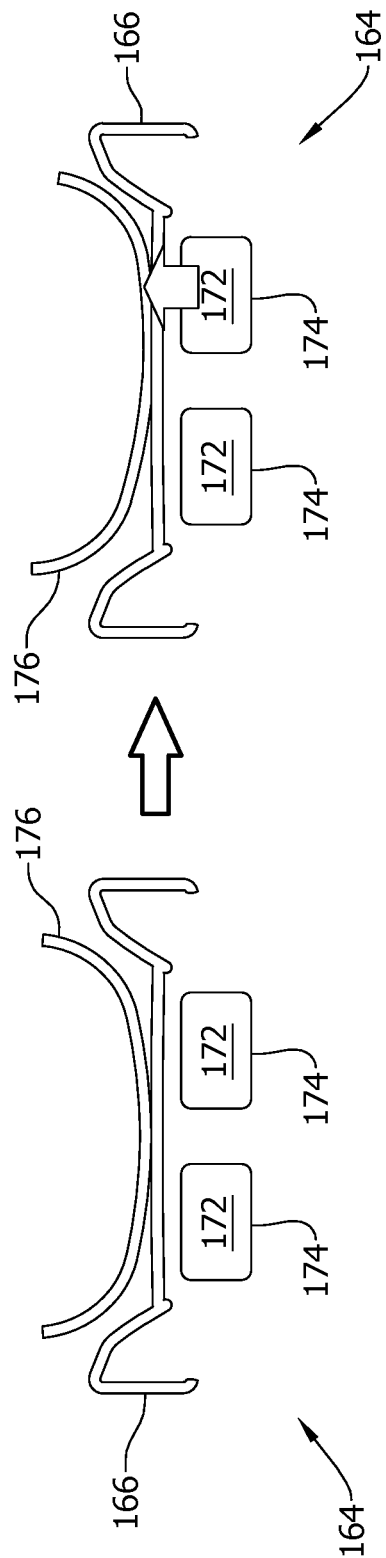
FIG. 5 is an internal front-to-back view of a seat bottom of the passenger seat shown in FIG. 4.

FIG. 4 is an internal side view of an alternative passenger seat 164 that may be used with vehicle 100 (shown in FIG. 1), and FIG. 5 is an internal front-to-back view of a seat bottom of passenger seat 164. In the exemplary embodiment, passenger seat 164 includes a seat bottom 166, a seat back 168, and a cushion 170 associated with at least one of seat bottom 166 or seat back 168. As shown in FIG. 4, cushion 170 includes a plurality of support structures 172 and a plurality of bladders 174 positioned at different locations within cushion 170. Each support structure 172 is associated with one of bladders 174, and each bladder 174 encapsulates a respective support structure 172. In one embodiment, support structure 172 is formed from an open-cell or porous foam material such as, but not limited to, polyurethane, polyester, polyethylene, and the like. The porous foam material may have a porosity defined within a range between about 20 percent and about 40 percent, and may have a density defined within a range between about 30 $kg/m^3$ and about 90 $kg/m^3$.

Similar to bladder 108, bladder 174 is in communication with actuator 140 (shown in FIG. 1) for selectively inflating and deflating cushion 170. Forming support structure 172 from a porous foam material enables air to be received within support structure 172 as the air is selectively fed to bladder 174. Accordingly, support structure 172 provides rigidity and support to a passenger seated in passenger seat 164, and bladder 174 provides additional seat hardness control based on an operating mode in which system 138 (shown in FIG. 1) is operating.

For example, the hardness of passenger seat 164 may be adjustable based on feedback received from suspension monitoring device 156 (shown in FIG. 1), as described above. For example, as shown in FIG. 4, a passenger 176 may be seated on passenger seat 164 in a neutral position during normal driving conditions, and the weight of passenger 176 may shift from side-to-side as the vehicle experiences increased G-forces during cornering, for example. In an alternative embodiment, the hardness of passenger seat 164 may be adjustable based on an operating mode in which vehicle 100 is operating. Accordingly, in operation, selective inflation and deflation of individual bladders 174 may be controlled based on load change data received from suspension monitoring device 156, wherein actuator 140 selectively inflates or deflates bladders 174 based on the load change data. In such an embodiment, the selective inflation and deflation of bladders 174 may only be enabled when vehicle 100 is operating in a certain operating mode, such as the sport driving mode.

In an alternative embodiment, the hardness of passenger seat 164 may be adjustable based on a pressure induced on cushion 170 from a passenger. Accordingly, referring again to FIG. 4, cushion 170 may also include a pressure sensor 178 positioned therein. Pressure sensor 178 may be any device capable of monitoring a pressure distribution, of a passenger against cushion 170, across cushion 170. Accordingly, in one embodiment, pressure sensor 178 includes a layer 180 of pressure sensing fabric extending between support structures 172 and an outer layer 182 of cushion 170. The pressure sensing fabric may be fabricated of conductive material that uses piezo-resistive functionality to monitor the pressure distribution across cushion 170.

In operation, layer 180 of pressure sensing fabric monitors the pressure distribution, and a computing device, such as ECU 154 (shown in FIG. 1), compares the monitored pressure to a threshold value. The threshold value may be a preset value, or may be calculated based on passenger information, such as pressure area, overall weight, stature, posture, and the like. Thus, the threshold value may be calculated based on the passenger information to determine a high pressure threshold that may result in discomfort to the passenger seated on cushion 170. Accordingly, actuator 140 is configured to deflate one or more of bladders 174 when pressure sensor 178 senses a pressure induced on cushion 170 that is greater than the threshold value.

In other embodiments, actuator 140 selectively inflates and deflates bladders 174 based on a preprogrammed operation. In a first preprogrammed operation, system 138 operates to slowly inflate and deflate bladders 174 over the time in which vehicle 100 is in operation. The inflation and deflation is performed at a rate in which the passenger should not notice changes in the seat hardness. The rate of inflation or deflation may be equal to or less than about 6.5 liters per minute. In addition, bladders 174 may be inflated to a high internal pressure threshold, deflated to a low internal pressure threshold, and a cyclic pattern of inflation and deflation repeated over the time in which vehicle 100 is in operation. Accordingly, system 138 facilitates providing the passenger with dynamic posture adjustments to reduce passenger fatigue and discomfort.

In a second preprogrammed operation, system 138 progressively increases the hardness of cushion 170 over the time in which vehicle 100 is operating. For example, actuator 140 progressively increases the hardness of cushion 170 from an initial hardness level to a predetermined increased hardness level. At the initial hardness level, cushion 170 is softer and has a more luxurious feel. The hardness of cushion 170 is then progressively increased to enhance support to the passenger and facilitate reducing passenger fatigue. The increased hardness level is maintained after the level has been reached, and for a remainder of the time in which vehicle 100 is operating. System 138 is configured to return cushion 170 to the initial hardness level when vehicle 100 ceases operation (i.e., has been turned off).

In other embodiments, system 138 adjusts the hardness of cushion 170 based on user preferences as received at a user interface, for example, or may be programmed to operate with different default hardness setting as determined by inflation of bladders 174 based on user preferences in different markets.

The embodiments described herein relate to systems and methods of adjusting the hardness of a seat based on based on feedback received from various systems of the vehicle, based on a preprogrammed operation, or combinations thereof. For example, a bladder system within the passenger seat may be selectively deflatable as the vehicle encounters poor road conditions such as potholes, construction zones, speed bumps, and the like, or the bladder system may be selectively inflatable to reduce passenger fatigue over long road trips. Deflating the bladder system facilitates the absorption of vibrational load changes experienced by the vehicle and potentially transferred to the occupant, thereby enhancing the comfort of the occupant. In addition, the actuator can inflate certain regions of the bladder system as the vehicle experiences increased G-forces during cornering, for example, to provide increased support to the occupant. As such, the occupant(s) of the vehicle are provided with increased comfort and a dynamically adjustable driving experience.

Exemplary embodiments of an adjustable seat hardness system are described above in detail. Although the systems herein are described and illustrated in association with a motor vehicle, the invention is also intended for use in any vehicle that experiences load changes and vibrational responses during operation thereof. Moreover, it should also be noted that the components of the invention are not limited to the specific embodiments described herein, but rather, aspects of each component may be utilized independently and separately from other components and methods described herein.

This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An adjustable seat hardness system for use with a vehicle, the system comprising:
    a cushion associated with a passenger seat of the vehicle, the cushion comprising a support structure and a bladder encapsulating the support structure, wherein the support structure is formed from a porous foam material; and
    an actuator in communication with the bladder, wherein the actuator is configured to selectively adjust the hardness of the cushion by inflating and deflating the bladder based on (i) a relative difference between values of load change data and a predetermined threshold or (ii) a relative difference between a frequency of the load change data and a predetermined value, the load change data sensed by at least one sensor of a suspension system of the vehicle, the at least one sensor including (a) a force sensor configured to sense a damping force at a damper associated with a wheel of the vehicle or (b) a vibration sensor configured to sense vibrational forces at the wheel of the vehicle.

2. The system in accordance with claim 1 further comprising a pressure sensor positioned within the cushion, the pressure sensor configured to monitor a pressure distribution, of a passenger against the cushion, across the cushion.

3. The system in accordance with claim 2, wherein the pressure sensor comprises a layer of pressure sensing fabric extending between the support structure and an outer layer of the cushion.

4. The system in accordance with claim 1, wherein the cushion comprises a plurality of support structures and a plurality of bladders positioned at different locations within the cushion, wherein each support structure is associated with one of the plurality of bladders.

5. The system in accordance with claim 1, wherein the porous foam material has a porosity defined within a range between about 20 percent and about 40 percent.

6. The system in accordance with claim 1, wherein the porous foam material has a density defined within a range between about 20 kg/m3 and about 40 kg/m3.

7. A vehicle comprising:
    a passenger seat comprising a seat bottom, a seat back, and a cushion associated with at least one of the seat bottom and the seat back, the cushion comprising a support structure and a bladder encapsulating the support structure, wherein the support structure is formed from a porous foam material;
    a suspension system responsive to road conditions in which the vehicle travels, the suspension system comprising at least one sensor, the at least one sensor including (a) a force sensor configured to sense a damping force at a damper associated with a wheel of the vehicle or (b) a vibration sensor configured to sense vibrational forces at the wheel of the vehicle; and
    an actuator in communication with the bladder, wherein the actuator is configured to selectively adjust the hardness of the cushion by inflating and deflating the bladder based on (i) a relative difference between values of load change data sensed by the at least one sensor and a predetermined threshold or (ii) a relative difference between a frequency of the load change data sensed by the at least one sensor and a predetermined value.

8. The system in accordance with claim 7 further comprising a pressure sensor positioned within the cushion, wherein, when in a first operating mode, the actuator is configured to deflate the bladder when a pressure induced to the cushion and sensed by the pressure sensor is greater than a threshold.

9. The system in accordance with claim 7, wherein, when in a second operating mode, the actuator is configured to inflate and deflate the bladder in a cyclic pattern over a time in which the vehicle is operating.

10. The system in accordance with claim 7 further comprising a driving mode selection system configured to operate the vehicle in a plurality of driving modes, wherein, when in a third operating mode, the actuator is configured to selectively adjust the hardness of the cushion.

11. The system in accordance with claim 10, wherein, when the actuator is in the third operating mode and the vehicle is operating in a sport driving mode of the plurality of driving modes, the actuator is configured to selectively adjust the hardness in certain regions of the cushion based on directional forces experienced by the vehicle.

12. The system in accordance with claim 7 wherein, when in a fourth operating mode, the actuator is further configured to control the selective adjustment of the hardness of the cushion based on positional road condition data received from the suspension system and location data received from a vehicle global positioning system.

13. The system in accordance with claim 7, wherein, when in a fifth operating mode, the actuator is configured to progressively increase the hardness of the cushion over a time in which the vehicle is operating.

14. The system in accordance with claim 13, wherein, when in the fifth operating mode, the actuator is configured to progressively increase the hardness of the cushion from an initial hardness level, and is configured to return the cushion to the initial hardness level when the vehicle ceases operation.

15. A method of adjusting seat hardness of a passenger seat in a vehicle, the passenger seat including a seat bottom, a seat back, and a cushion associated with at least one of the seat bottom and the seat back, the cushion including a support structure and a bladder encapsulating the support structure, wherein the support structure is formed from a porous foam material, the method comprising:
  monitoring load change data sensed by at least one sensor of a suspension system of the vehicle while the vehicle is being driven, the at least one sensor including (a) a force sensor configured to sense a damping force at a damper associated with a wheel of the vehicle or (b) a vibration sensor configured to sense vibrational forces at the wheel of the vehicle; and
  selectively adjusting the hardness of the cushion by inflating and deflating the bladder based on (i) a relative difference between values of the load change data sensed by the at least one sensor and a predetermined threshold or (ii) a relative difference between a frequency of the load change data sensed by the at least one sensor and a predetermined value.

16. The method in accordance with claim 15, further comprising:
  monitoring a pressure distribution, of a passenger against the cushion, across the cushion; and
  reducing the hardness of the cushion, by deflating the bladder, when a pressure induced to the cushion is greater than a threshold.

17. The method in accordance with claim 15, further comprising:
  monitoring a driving mode in which the vehicle is operating; and
  when the vehicle is in a sport driving mode, selectively adjusting the hardness in certain regions of the cushion based on directional forces experienced by the vehicle.

18. The method in accordance with claim 15, further comprising:
  monitoring a global positioning system of the vehicle; and
  selectively adjusting the hardness of the cushion based on positional road condition data.

19. The method in accordance with claim 15, further comprising:
  monitoring an operating status of a seat hardness control unit, wherein the seat hardness control unit is operable in at least one automatic preset operating mode; and
  selectively adjusting the hardness of the cushion in accordance with the at least one automatic preset operating mode.

20. The method in accordance with claim 19, wherein selectively adjusting the hardness of the cushion in accordance with the at least one automatic preset operating mode comprises:
  when in a first automatic preset operating mode, increasing and decreasing the hardness of the cushion in a cyclic pattern over a time in which the vehicle is operating; or
  when in a second automatic preset operating mode, progressively increasing the hardness of the cushion to a threshold level over a time in which the vehicle is operating.

* * * * *